United States Patent
Ichikawa

(10) Patent No.: US 9,615,026 B2
(45) Date of Patent: Apr. 4, 2017

(54) IMAGING APPARATUS AND CONTROL METHOD OF IMAGING APPARATUS

(71) Applicant: CANON KABUSHIKI KAISHA, Tokyo (JP)

(72) Inventor: Sho Ichikawa, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 14/282,933

(22) Filed: May 20, 2014

(65) Prior Publication Data
US 2014/0347542 A1    Nov. 27, 2014

(30) Foreign Application Priority Data

May 22, 2013   (JP) .................................. 2013-108151

(51) Int. Cl.
| | | |
|---|---|---|
| *H04N 5/222* | (2006.01) | |
| *H04N 5/225* | (2006.01) | |
| *H04N 5/232* | (2006.01) | |
| *G03B 13/02* | (2006.01) | |

(52) U.S. Cl.
CPC ......... *H04N 5/23293* (2013.01); *G03B 13/02* (2013.01); *H04N 5/23245* (2013.01)

(58) Field of Classification Search
CPC .. H04N 1/2112; H04N 1/212; H04N 2101/00; H04N 2201/214; H04N 2201/216; H04N 5/23245; H04N 5/23293
See application file for complete search history.

(56) References Cited

U.S. PATENT DOCUMENTS

| | | | | |
|---|---|---|---|---|
| 7,701,500 B2* | 4/2010 | Aizawa | ................ | G11B 27/034 348/231.2 |
| 2002/0198006 A1* | 12/2002 | Hirayama | ........... | H04M 1/0233 455/456.1 |
| 2007/0115368 A1* | 5/2007 | Kamiya | ............... | H04N 1/2112 348/220.1 |
| 2009/0295975 A1* | 12/2009 | Takahashi | .......... | H04N 5/23293 348/333.01 |

FOREIGN PATENT DOCUMENTS

| | | |
|---|---|---|
| JP | 2001-186386 A | 7/2001 |
| JP | 2005-184611 A | 7/2005 |
| JP | 2011-40852 A | 2/2011 |

\* cited by examiner

*Primary Examiner* — Trung Diep
(74) *Attorney, Agent, or Firm* — Canon U.S.A. Inc., IP Division

(57) ABSTRACT

A digital camera includes: a display unit of a variable angle monitor unit linked to a main body unit including an imaging unit, so as to be capable of opening and closing as to the main body unit; a variable angle state detecting unit to detect the position of the variable angle monitor unit as to the main body unit; and a system control unit to effect control such that, in a case of the variable angle state detecting unit detecting that the position of the variable angle monitor unit has changed from a closed position to an open position, a newest image is not displayed on the display unit if time elapsed from shooting immediately prior is a predetermined amount of time or more, and the newest image shot immediately prior is displayed on the display unit if the time elapsed is less than the predetermined amount of time.

8 Claims, 9 Drawing Sheets

| STATE | STATE 301 | STATE 302 | STATE 303 | STATE 304 | STATE 305 |
|---|---|---|---|---|---|
| HALL EFFECT IC SIGNAL 306 | HIGH | HIGH | HIGH | HIGH | LOW |
| SWA SIGNAL 307 | HIGH | LOW | LOW | HIGH | HIGH |
| SWB SIGNAL 308 | LOW | LOW | HIGH | HIGH | HIGH |
| CALLED | REVERSE-CLOSED POSITION | FACING POSITION | FULL-OPEN POSITION | HALF-OPEN POSITION | CLOSED POSITION |

FIG. 3

| STATE | STATE 301 | STATE 302 | STATE 303 | STATE 304 | STATE 305 |
|---|---|---|---|---|---|
| HALL EFFECT IC SIGNAL 306 | HIGH | HIGH | HIGH | HIGH | LOW |
| SWA SIGNAL 307 | HIGH | LOW | LOW | HIGH | HIGH |
| SWB SIGNAL 308 | LOW | LOW | HIGH | HIGH | HIGH |
| CALLED | REVERSE-CLOSED POSITION | FACING POSITION | FULL-OPEN POSITION | HALF-OPEN POSITION | CLOSED POSITION |

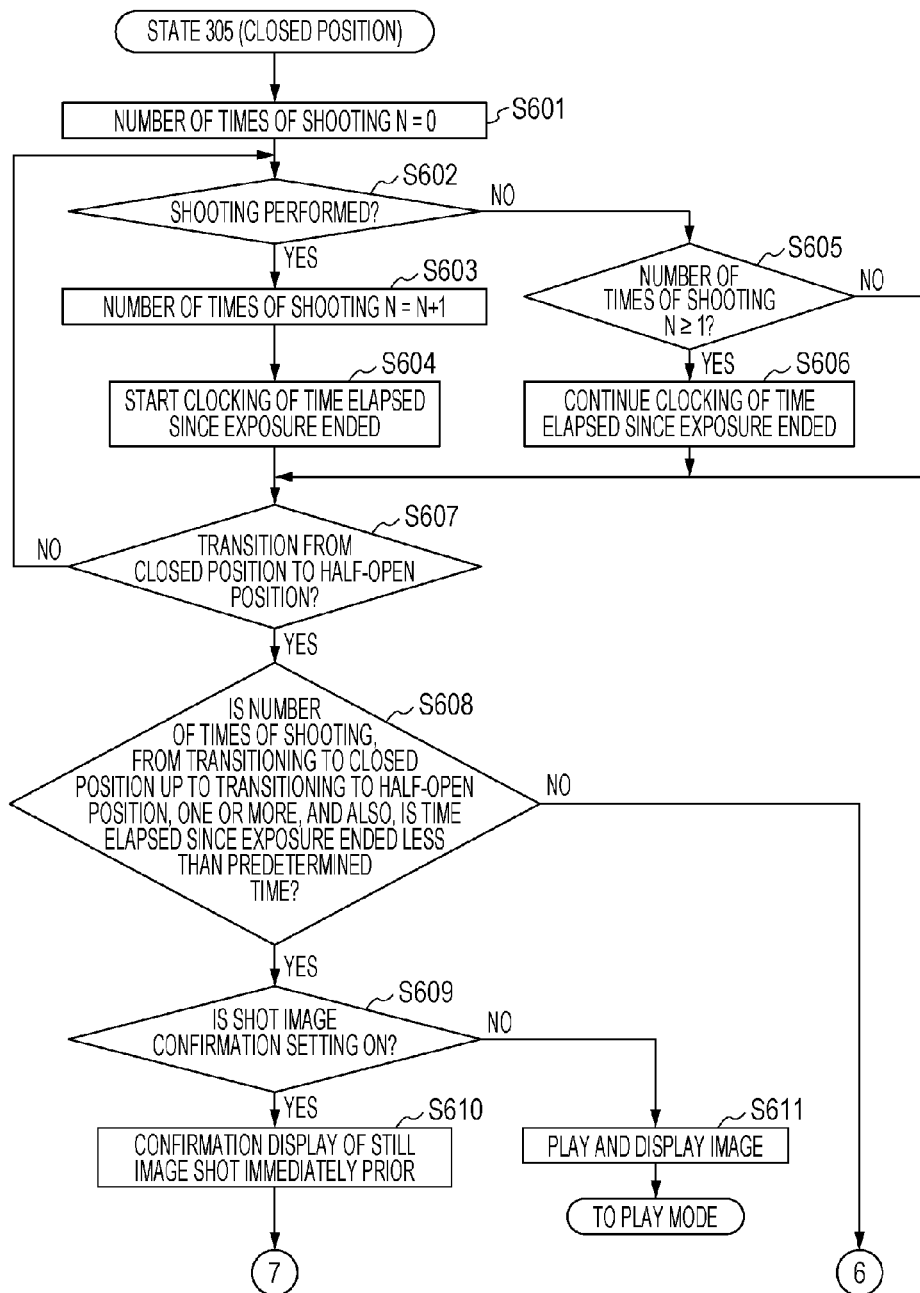

IMAGING APPARATUS AND CONTROL METHOD OF IMAGING APPARATUS

BACKGROUND OF THE INVENTION

Field of the Invention

The present invention relates to an imaging apparatus, a control method of the imaging apparatus, a program, and a storage medium. More particularly, the present invention relates to an imaging apparatus including a display device having a variable angle mechanism, and a control method of this imaging apparatus.

Description of the Related Art

As of recent, more imaging apparatus include a display device on the rear face thereof serving as a viewfinder, for a user to decide the composition of an image of a subject, and to confirm an image acquired by imaging. There are also display devices having a variable angle mechanism, whereby the angle of the display device can be freely adjusted according to the angle at which the imaging apparatus is being held. Japanese Patent Laid-Open No. 2011-40852 discloses an imaging apparatus which switches between a still image shooting mode and a moving image shooting mode, in accordance with the position of a variable angle monitor unit.

On the other hand, there are also imaging apparatuses which enable a review display, where a confirmation display is automatically performed of an image which has just been shot, for a predetermined amount of time.

Japanese Patent Laid-Open No. 2001-186386 discloses an imaging apparatus in which continuing to press a shutter button for a predetermined amount of time after a shooting instruction signal SW2 corresponding to a full press of the shutter button has been issued, causes an imaged image shot immediately before (the latest image that has been shot) to be displayed while remaining in the imaging mode, thus enabling the image to be sufficiently confirmed.

If a user performs an operation to open the variable angle monitor unit, this means that the user wants to view a display on the variable angle monitor. Accordingly, display should preferably start automatically, but what the user desires to view may differ depending on the timing at which the user opens the variable angle monitor unit. Accordingly, the same display performed each time may not be what the user wants to view displayed. For example, a user opening the variable angle monitor in the shooting mode may be wanting to view a live view image, but even so, if the timing of opening the variable angle monitor in the shooting mode is immediately after shooting a picture, the user may be wanting to confirm the image shot immediately before.

SUMMARY OF THE INVENTION

It has been found desirable to provide an imaging apparatus which enables what the user desires to view displayed, to be displayed in accordance with timing of operating a variable angle monitor unit.

Provided is an imaging apparatus includes: a main body unit; an imaging unit included in the main body unit; a monitor unit linked to the main body unit so as to be capable of being opened and closed as to the main body unit; a display unit included in the monitor unit; a monitor position detecting unit configured to detect the position of the monitor unit as to the main body unit; and a display control unit. The display control unit is configured to effect control such that, in a case of the monitor position detecting unit detecting that the position of the monitor unit has changed from a closed position where a display face of the display unit faces the main body unit to an open position, information for shooting is displayed on the display unit if time elapsed from shooting immediately prior is a predetermined amount of time or more, and a newest image shot immediately prior is displayed on the display unit if the time elapsed from shooting immediately prior is less than the predetermined amount of time.

Provided is an imaging apparatus including: a viewfinder; a proximity detecting unit configured to detect proximity of an object as to the viewfinder; a main body unit; an imaging unit included in the main body unit; a monitor unit linked to the main body unit so as to be capable of being opened and closed as to the main body unit; a display unit included in the monitor unit; a monitor position detecting unit configured to detect the position of the monitor unit as to the main body unit; and a display control unit. The display control unit configured to effect control such that, in a case of the monitor position detecting unit detecting that the position of the monitor unit has changed from a closed position where a display face of the display unit faces the main body unit to an open position, and also the proximity detecting unit is not detecting proximity of an object to the viewfinder, a newest image shot immediately prior is not displayed on the display unit if time elapsed from the state of the proximity detecting unit transitioning from a state in which an object was detected in proximity of the viewfinder to a state in which an object is not detected in proximity of the viewfinder is a predetermined amount of time or more, and the newest image is displayed on the display unit if the time elapsed is less than the predetermined amount of time.

Further features of the present invention will become apparent from the following description of exemplary embodiments with reference to the attached drawings.

BRIEF DESCRIPTION OF THE DRAWINGS

FIG. 3 is an explanatory diagram illustrating correlation between states of a variable angle monitor unit and state detection signals according to an embodiment of the present invention.

FIGS. 6A and 6B illustrate is a flowchart of display content control according to the timing at which the state of the variable angle monitor unit changes, according to a third exemplary embodiment of the present invention.

DESCRIPTION OF THE EMBODIMENTS

An embodiment of the present invention will now be described with reference to the attached drawings.

Figure 1:
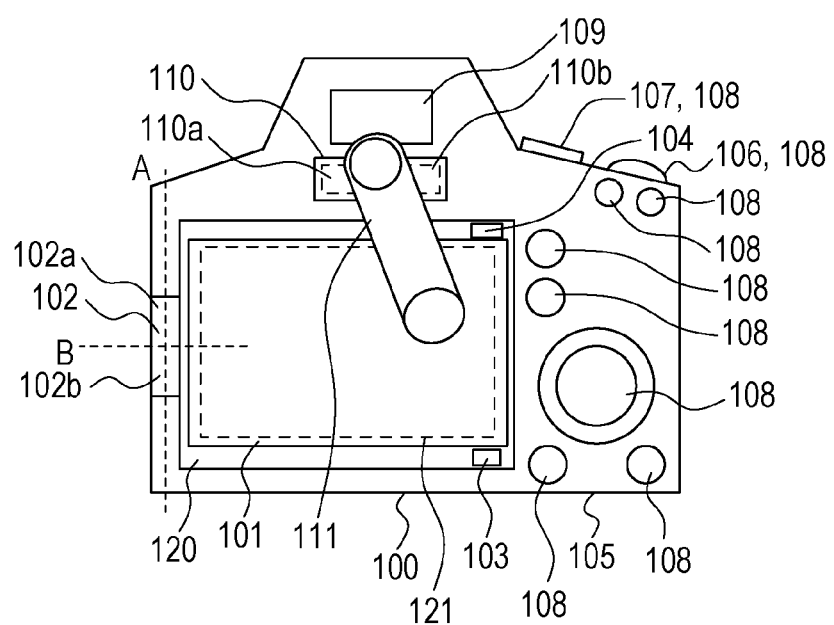
FIG. 1 is an external perspective view of a digital camera according to an embodiment of the present invention.

FIG. 1 illustrates an external view of a digital camera 100 serving as an example of the imaging apparatus according to the present invention.

The digital camera 100 includes a variable angle monitor unit 120, which in turn includes a display unit 101 having a display screen 121 which displays images and various types of information. A liquid crystal panel or the like, for example, is applied to the display unit 101. The variable angle monitor unit 120 has a configuration so as to be able to open and close as to a main body unit 105 of the digital camera 100, by way of a variable angle mechanism. In more detail, the variable angle mechanism of the variable angle monitor unit 120 has a hinge portion 102 including an open/close rotation axis A and a rotation axis B for rotating. The variable angle monitor unit 120 is linked to the main body unit 105 of the digital camera 100 so as to be capable of opening and closing on the hinge portion 102. The variable angle monitor unit 120 can rotate on the rotation axis A for opening and closing so as to open and close as to the main body unit 105. The variable angle monitor unit 120 can further rotate on the rotation axis B for rotating so as to invert the orientation of the display screen 121 of the display unit 101.

Reference numerals 102a and 102b denote sensors of the hinge portion 102 (hereinafter written as SWA and SWB, respectively). The SWA 102a is configured to detect that the variable angle monitor unit 120 has opened or closed in the sideways direction (on the rotation axis A for opening and closing) a predetermined angle or greater. The SWB 102b is configured to detect that the variable angle monitor unit 120 has rotated perpendicularly (on the rotation axis B for rotating) a predetermined angle or greater.

A magnet 103 and a Hall effect integrated circuit (IC) 104 detect that the variable angle monitor unit 120 has opened as to the main body unit 105 by a predetermined angle or greater. The magnet 103 is disposed within the variable angle monitor unit 120. The Hall effect IC 104 is disposed within the main body unit 105. These components are arranged such that the Hall effect IC 104 is situated in the neighborhood of the magnet 103 in a state where the display screen 121 of the display unit 101 is closed facing the main body unit 105.

A shutter button (release switch) 106 is an operating member included in an operating unit 108. The shutter button 106 is used by the user to give shooting preparation instructions and shooting instructions to the digital camera 100.

A mode dial 107 is an operating member included in the operating unit 108, and is used by the user to switch the operating mode of the digital camera 100.

The operating unit 108 is an operating unit made up of operating members such as various types of switches, buttons, and the like, to accept various types of operations from the user.

A viewfinder 109 aids the user is deciding the composition of an image of a subject.

Reference numeral 110 denotes a proximity detection sensor. The proximity detection sensor 110 detects whether an object-to-be-detected 111 is in the proximity of the viewfinder 109. Reference numeral 110a denotes an infrared ray emission lens window of the proximity detection sensor 110. Reference numeral 110b denotes an infrared ray reception lens window of the proximity detection sensor 110. The infrared ray emission lens window 110a emits infrared rays at predetermined intervals, and the infrared ray reception lens window 110b receives the rays reflected off of the later-described object-to-be-detected 111. The proximity detection sensor 110 then detects whether the later-described object-to-be-detected 111 is at a stipulated position, based on the quantity of received light.

The object-to-be-detected 111 is an object which is detected by the proximity detection sensor 110, such as the face or a finger of the user when using the viewfinder, for example.

Figure 2:
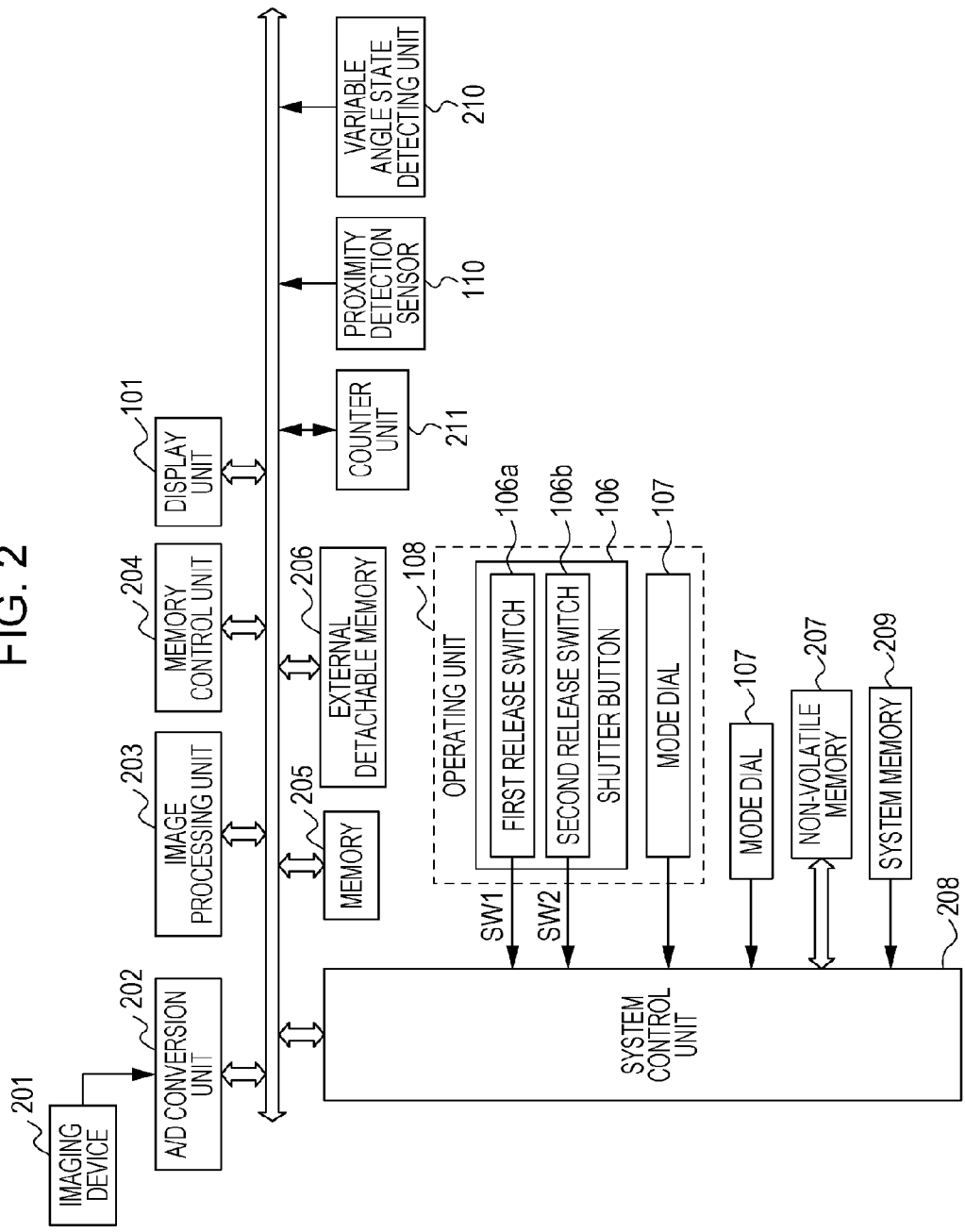
FIG. 2 is a block diagram illustrating the configuration of a digital camera according to an embodiment of the present invention.

FIG. 2 is a block diagram illustrating a configuration example of the digital camera 100 according to the present embodiment.

An imaging device 201 is a CCD or CMOS device or the like, which converts optical images into electric signals. The imaging device 201 is provided in the main body unit 105 of the digital camera 100. Upon the shutter button 106 being pressed, an optical image of a subject is imaged on the imaging device 201, by way of unshown lenses and the like. The imaging device 201 then converts the imaged optical image into analog electric signals (image data).

An A/D conversion unit 202 converts analog electrical signals of the image data output from the imaging device 201 into digital electric signals.

An image processing unit 203 subjects the image data from the A/D conversion unit 202, or image data from a later-described memory control unit 204, to image processing like predetermined pixel interpolation resizing processing such as reduction, color conversion processing, and so forth. The image processing unit 203 performs predetermined calculation processing using the imaged image data. A later-described system control unit 208 performs exposure control and ranging control based on the obtained calculation results. This serves as the basis for through-the-lens (TTL) autofocus (AF) processing, automatic exposure (AE) processing, and flash preliminary emission. Further, the image processing unit 203 performs predetermined calculation processing using the image data that has been imaged, and also performs TTL auto white balance (AWB) processing based on the obtained calculation results.

The memory control unit 204 controls exchange of data between the A/D conversion unit 202, image processing unit 203, variable angle monitor unit 120, and later-described memory 205 and external detachable memory 206.

The memory 205 stores image data obtained by the imaging device 201 and converted into digital electric signals by the A/D conversion unit 202, and image data to be displayed on the display unit 101. The memory 205 as sufficient storage capacity to store a predetermined number of still images or a predetermined amount of time of moving images and audio.

The external detachable memory 206 is a storage medium such as a memory card or the like in which is recorded images that have been shot. Semiconductor memory, magnetic disks, or the like, are used for this.

Non-volatile memory 207 is memory which is electrically erasable/recordable. EEPROM or the like, for example, is used for the non-volatile memory 207. Constants for a later-described system control unit 208 to operate, programs, and so forth are stored in the non-volatile memory 207. The term "program" as used here means programs to execute the later-described flowcharts of the embodiment.

The system control unit 208 controls the overall digital camera 100. The system control unit 208 has a central processing unit (CPU) which executes predetermined calculations. Various processes of the embodiment, which are described later, are executed by the CPU of the system control unit 208 reading out and executing programs recorded in the non-volatile memory 207. The system control unit 208 also performs display control, by controlling the memory 205, display unit 101, and so forth.

Random access memory (RAM) is used for system memory 209. Constants and variables for the system control unit 208 to operate, programs read out from the non-volatile memory 207, and so forth, are loaded to the system memory 209.

The operating unit 108 which includes the mode dial 107, and a later-described first release switch 106a and second release switch 106b, is an operating member for inputting various types of operation instructions to the system control unit 208.

The mode dial 107 is an operating member to switch the operation mode of the system control unit 208 to one of still image recording mode, moving image recording mode, or the like. Modes included in the still image recording mode include auto shooting mode, auto scene determination mode, manual mode, various scene modes whereby shooting settings are made according to the scene being shot, programmed AE mode, custom mode, and so forth. The user operates the mode dial 107 to directly switch to any one of these modes included in the still image recording mode. Also, an arrangement may be made where the user first switches to the still image recording mode by operating the mode dial 107, and then further operates another operating member to switch to any one of these modes included in the still image recording mode. Multiple modes may be included in the moving image recording mode as well.

The first release switch 106a turns on partway through operation of the shutter button 106 provided to the digital camera 100 (a so-called "half press", also referred to as a "shooting preparation instruction"), and generates a first release switch signal SW1. The system control unit 208 and other components operate with the first release switch signal SW1 as a trigger, to start operations such as autofocus (AF) processing, automatic exposure (AE) processing, auto white balance (AWB) processing, and flash preliminary emission, which are shooting preparation operations.

The second release switch 106b turns on upon completion of operation of the shutter button 106 (a so-called "full press", also referred to as a "shooting instruction"), and generates a second release switch signal SW2. The system control unit 208 operates with the second release switch signal SW2 as a trigger to start a series of shooting processing actions, from reading out signals from the imaging device 201 to writing image data to the external detachable memory 206.

The operating members of the operating unit 108 are assigned various functions depending on the scene, when various function icons displayed on the display unit 101 of the variable angle monitor unit 120 are selected and operated. This, the operating members of the operating unit 108 act as various types of function buttons. Examples of function buttons include a quit button, return button, an image forward button, a shutter button, a narrowing-down button, an attribute change button, a playback button, and so forth. For example, when a menu button is pressed, the system control unit 208 displays a menu screen enabling various types of settings on the display unit 101. The user can intuitively perform various types of settings using the menu screen displayed on the display unit 101, a four-way button such as a D-pad, and a set button. The user can transition the operating mode of the digital camera 100 to a playback mode by pressing the playback button. In the playback mode, the user can display images that have been shot and stored in the external detachable memory 206, on the display unit 101.

Note that operating members (operating unit 108) other than the mode dial 107 and shutter button 106 are omitted from illustration in FIG. 2.

A variable angle state detecting unit 210 (monitor position detecting unit) is configured including a SWA 102a, a SWB 102b, the magnet 103, and the Hall effect IC 104. The variable angle state detecting unit 210 then detects the open/closed state and the rotated state of the variable angle monitor unit 120.

A counter unit 211 measures elapsed time from the immediately prior shooting (latest shooting) processing.

FIG. 3 is an explanatory diagram illustrating the correlation between the state of the variable angle monitor unit 120, and state detection signals of the variable angle state detecting unit 210, according to the present embodiment.

A state 301 is a state where the variable angle monitor unit 120 has been closed, so that the display screen 121 (the face where images are displayed) of the display unit 101 is visible. This state 301 corresponds to a Hall element IC signal 306 (signal output by the Hall effect IC 104) of High, a SWA signal 307 (signal output by the SWA 102a) of High, and a SWB signal 308 (signal output by the SWB 102b) of Low.

A state 302 is a state where the variable angle monitor unit 120 is open such that the display screen 121 of the display unit 101 is not visible from the side where the viewfinder 109 is situated. This state 302 corresponds to a Hall element IC signal 306 of High, a SWA signal 307 of Low, and a SWB signal 308 of Low.

A state 303 is a state where the variable angle monitor unit 120 is open such that the display screen 121 of the display unit 101 is visible from the side where the viewfinder 109 is situated. This state 303 corresponds to a Hall element IC signal 306 of High, a SWA signal 307 of Low, and a SWB signal 308 of High.

A state 304 is a state where the variable angle monitor unit 120 is open such that the display screen 121 of the display unit 101 is generally perpendicular to the rear face of the main body unit 105 of the digital camera 100, and is an intermediate state between the state 303 and a later-described state 305. This state 304 corresponds to a Hall element IC signal 306 of High, a SWA signal 307 of High, and a SWB signal 308 of High.

The state 305 is a state where the variable angle monitor unit 120 is closed such that the display screen 121 of the display unit 101 is not visible. In this state 305, the display screen 121 of the display unit 101 faces the main body unit 105 of the digital camera 100. This state 305 corresponds to a Hall element IC signal 306 of Low, a SWA signal 307 of High, and a SWB signal 308 of High.

These states 301 through 305 are called by the following names.

State 301: Reverse-closed position
State 302: Facing position
State 303: Full-open position
State 304: Half-open position
State 305: Closed position Operations according to exemplary embodiments of the present invention will be described with reference to FIGS. 4A through 6B.

First Exemplary Embodiment

In a first exemplary embodiment, description will be made regarding processing to control display contents in accordance with the timing of state change of the variable angle monitor unit 120.

Figure 4A:
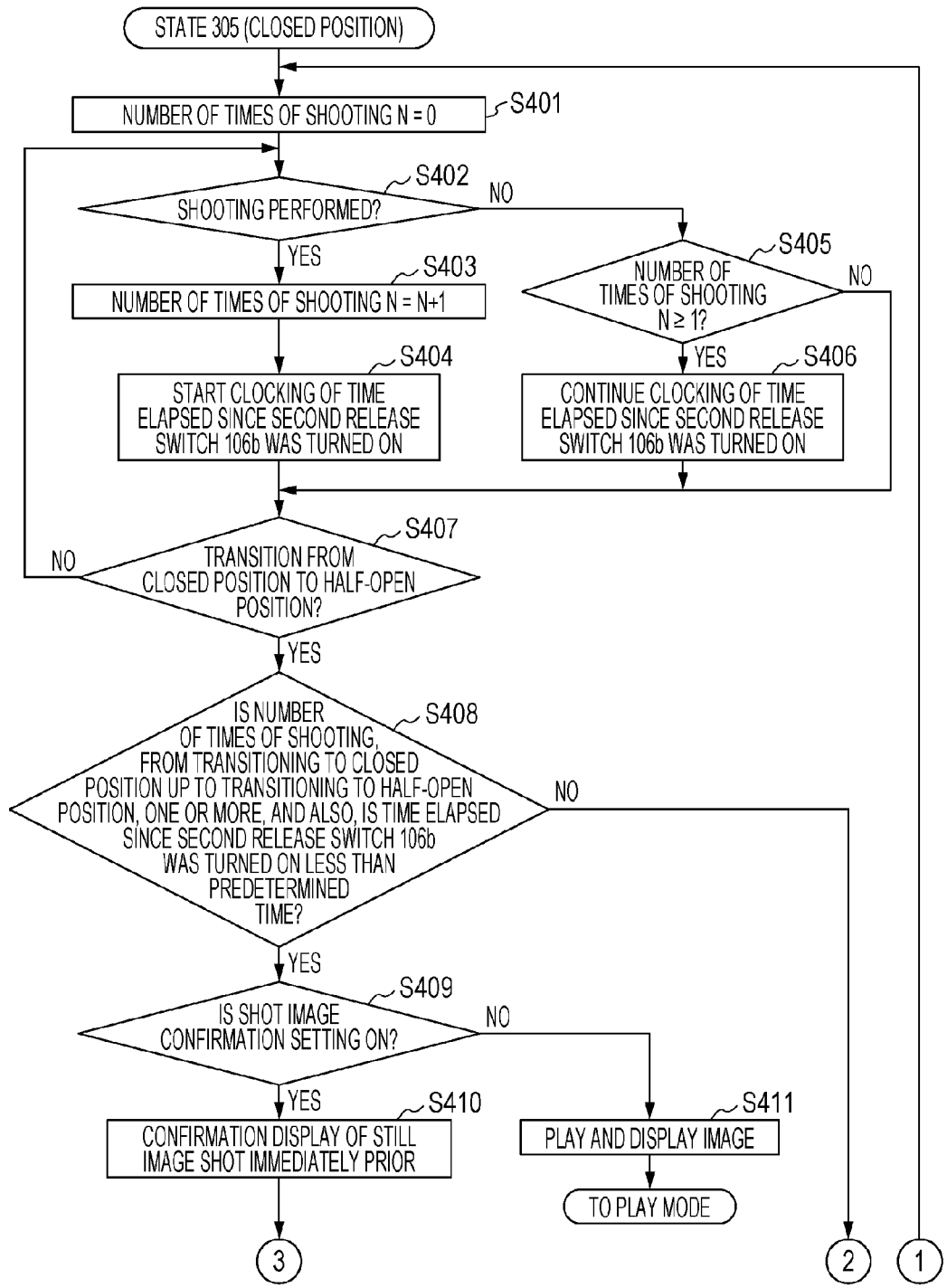
FIGS. 4A and 4B illustrate a flowchart of display content control according to the timing at which the state of the variable angle monitor unit changes, according to a first exemplary embodiment of the present invention.
Figure 4B:
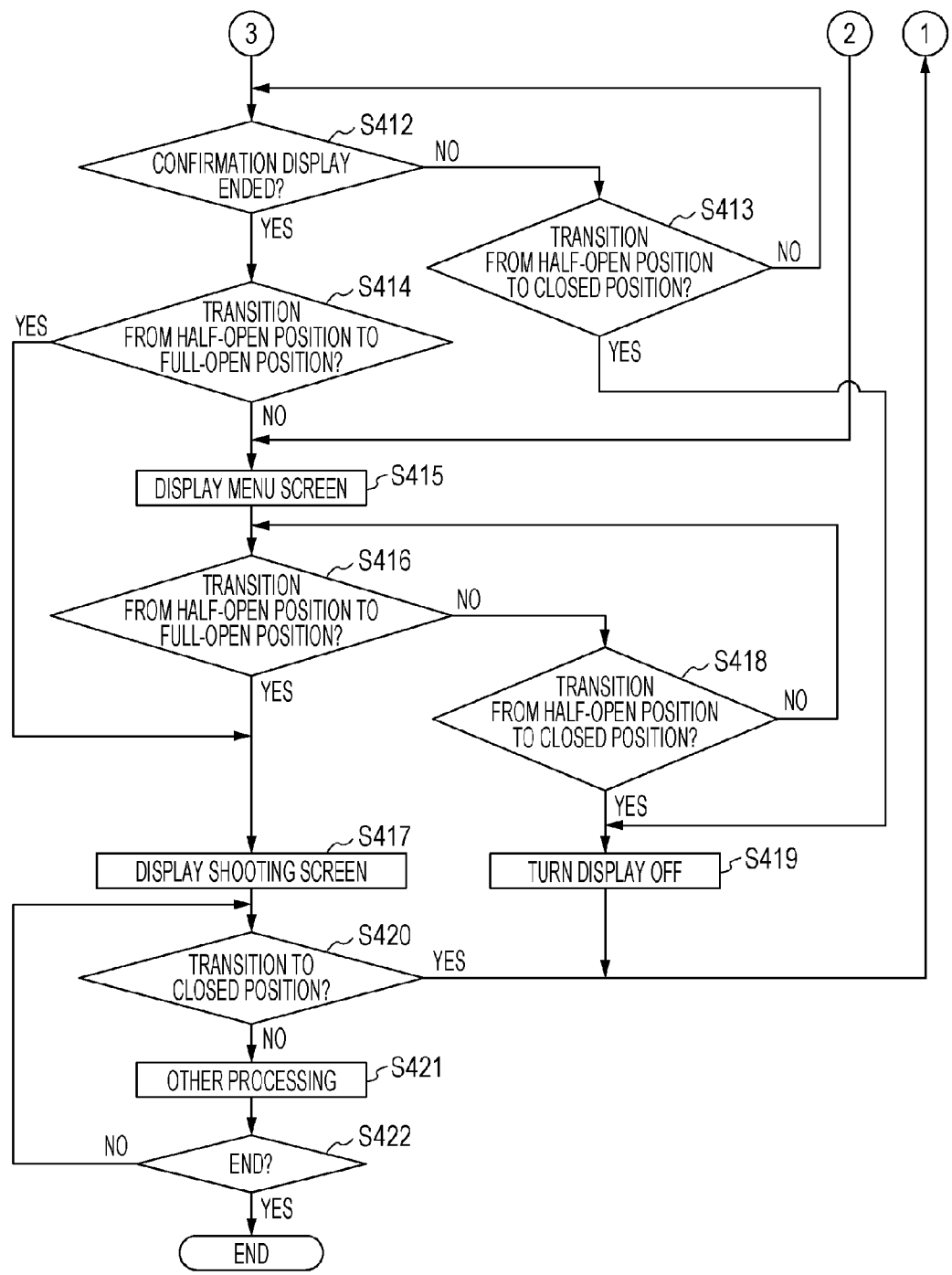

FIGS. 4A and 4B illustrate a flowchart of display control processing to control display contents in accordance with the timing of state change of the variable angle monitor unit 120, which is the first exemplary embodiment. A computer program to execute the display control processing in this flowchart is stored in the non-volatile memory 207, which is a storage medium, beforehand. The CPU of the system control unit 208 reads this computer program out from the non-volatile memory 207, loads it to the system memory 209, and executes it. Thus, the display control processing illustrated in this flowchart is carried out.

In S401, the system control unit 208 initializes the number of times of shooting N from the time that the variable angle monitor unit 120 has transitioned to the closed position till the time having transitioned to the half-open position (N=0), and the flow advances to S402.

In S402, the system control unit 208 determines whether or not shooting has been performed. If shooting has been performed, the flow advances to S403, and if not, to S405.

In S403, the system control unit 208 updates the number of times of shooting N from the time that the variable angle monitor unit 120 has transitioned to the closed position till the time having transitioned to the half-open position (N=N+1), and the flow advances to S404.

In S404, the system control unit 208 starts clocking the amount of time elapsed from the shutter button 106 having been full pressed and the second release switch 106b having turned on, and the flow advances to S407. Note that each time shooting is performed, the system control unit 208 resets the clock value of elapsed time to zero, and clocking is started anew.

In S405, the system control unit 208 determines whether or not the number of times of shooting N from the time that the variable angle monitor unit 120 has transitioned to the closed position till the time having transitioned to the half-open position is 1 or greater. In a case where the number of times of shooting N is 1 or greater, the flow advances to S406, and in a case where the number of times of shooting N is zero, the flow advances to S407.

In S406, the system control unit 208 continues clocking the amount of time elapsed from the shutter button 106 having been full pressed and the second release switch 106b having turned on, and the flow advances to S407.

In S407, the system control unit 208 determines whether or not the variable angle monitor unit 120 has transitioned from the close position to the half-open position. In a case where the variable angle monitor unit 120 has transitioned from the close position to the half-open position, the flow advances to S408, and if not, returns to S402.

In S408, the system control unit 208 determines whether or not both of the following (1) and (2) are satisfied; (1) the number of times of shooting N from the variable angle monitor unit 120 transitioning to closed position up to transitioning to half-open position is one or more, and (2) time elapsed since shutter button 106 was full-pressed and second release switch 106b turned on was less than a predetermined time x (less than predetermined time). The predetermined time x is an amount of time to determine whether within a time regarding which it is conceivable that the variable angle monitor unit 120 has been opened to view a quick review display of the image that has just been shot after the user has ended shooting immediately prior (ended the latest shooting), and is around several seconds. In a case where these (1) and (2) are satisfied, the flow advances to S409. If either one of (1) and (2) are not satisfied, the flow advances to S415.

In S409, the system control unit 208 determines whether or not a shot image confirmation setting is on. This shot image confirmation setting is a so-called quick review function, which is a function that automatically displays a shot image on the display unit 101 after shooting so as to be viewable. The user can set the shot image confirmation setting to be either on or off, from a menu beforehand. Alternatively, the user can set the amount of display time (review time) until the quick review is ended and the display unit 101 returns to the original display, or can set the quick review to be held. In a case where the shot image confirmation setting is on, the flow advances to S410, while the flow advances to S411 if the shot image confirmation setting is not on.

In S410, the system control unit 208 reads out image data of the newest image (still image shot immediately prior) from the external detachable memory 206, and displays this on the display unit 101. Here, the variable angle monitor unit 120 has been opened in a short amount of time after shooting with the variable angle monitor unit 120 in a closed state, shorter than the predetermined amount of time x (less than predetermined time). Thus, it can be assumed that the user has opened the variable angle monitor unit 120 in order to confirm the newest image that has just been shot. In this case, the quick review function is on. Accordingly, in S410 the system control unit 208 displays the newest image shot immediately prior, and starts clocking the time during which the display will be continued (display time). Note that display of the display unit 101 is off while in the closed position, so no quick review display is performed if in the closed position. In cases other than the display unit 101 being in the closed position, the system control unit 208 starts the quick review display immediately upon shooting being performed and processing for displaying being completed. On the other hand, the display in S410 is not a display performed immediately after shooting. No display is performed here immediately after shooting, since the display unit 101 is in the closed position. The display in S410 is a confirmation display started from the point that the display unit 101 is opened in less than a predetermined amount of time x, and thus differs from a regular quick review function in this sense.

In S411, the system control unit 208 transitions the operating mode of the digital camera 100 to the playback mode, and performs playback display of an image on the display unit 101. In a case where there is a new image shot after the last time that the mode was in the playback mode, the image initially displayed in the playback mode is not a resumed image but the newest image. A case is being described here where N is 1 or greater, so the newest image shot last is displayed in the playback mode. Accordingly, the user can confirm the newest image that has just been shot. In the playback mode, the user can perform switching between image feeding, enlarging, reducing, thumbnail display, and so forth, by operating the operating unit 108.

In S412, the system control unit 208 determines whether or not ending conditions to end the confirmation display started in S410 have been satisfied. The ending conditions are one of a case where a predetermined amount of time has elapsed since the display has been started of the still image shot immediately prior (the latest still image shot), and a case where the shutter button 106 has been half pressed and the first release switch 106a has turned on. The amount of time set beforehand from starting the display of the still image shot immediately prior may be an amount of time around several seconds, set beforehand. Note that this time is more preferably a review time which the user has set for a desired quick review display. In a case where the ending conditions have not been satisfied, the confirmation display is maintained and the flow advances to S413, and if satisfied, advances to S414.

In S413, the system control unit 208 determines whether or not the display unit 101 has transitioned from the half-open position to the closed position. In the case of having transitioned to the closed position the flow advances to S419, and if not, returns to S412.

In S414, the system control unit 208 determines whether or not the variable angle monitor unit 120 has transitioned from the half-open position to the full-open position during the confirmation display. That is to say, even if the variable angle monitor unit 120 transitions to the full-display position while performing the confirmation display of S410, the system control unit 208 continues the confirmation display. After having satisfied the ending conditions for the configuration display, the system control unit 208 performs the determination of S414 to determine what to display. In a case where the position of the variable angle monitor unit 120 has transitioned to the full-open position, the flow advances to S417. On the other hand, if the variable angle monitor unit 120 has not transitioned to the full-open position, i.e., if the variable angle monitor unit 120 remains in the half-open position, the flow advances to S415.

In S415, the system control unit 208 displays a menu screen on the display unit 101. In this state, the user can perform operation control of the shooting mode. For example, the user can change settings such as the shutter speed and f-stop value, by operating the operating unit 108.

In S416, the system control unit 208 determines whether or not the variable angle monitor unit 120 has transitioned from the half-open position to the full-open position. In a case where the variable angle monitor unit 120 has transitioned to the full-open position, the flow advances to S417, and if not, to S418.

In S417, the system control unit 208 performs live view (also called "through-the-lens") display, where images imaged by the imaging device 201 are sequentially updated and displayed on the display unit 101 in almost real time. If in a mirror lock-down state, the system control unit 208 raises the mirror to a mirror lock-up state, and starts the live view display where object light reaches the imaging device 201. After live view display is performed, the state is a shooting standby state, in which the user can perform various types of operation control of the shooting mode.

In S418, the system control unit 208 determines whether or not the variable angle monitor unit 120 has transitioned from the half-open state to the closed state. In a case where variable angle monitor unit 120 has transitioned to the closed state the flow advances to S419, and if not, returns to S416.

In S419, the system control unit 208 turns the display of the display unit 101 off. More specifically, the system control unit 208 turns off the backlight, and turns off the display at the display unit 101. The flow then returns back to S401 which is the first step in the processing in the closed position.

In S420, the system control unit 208 determines whether or not the variable angle monitor unit 120 has transitioned to the closed position. In a case where determination is made that the variable angle monitor unit 120 has transitioned to the closed position, the flow returns back to S401 which is the first step in the processing in the closed position. Otherwise, the flow proceeds to step S421.

In S421, various types of processing in states other than the closed position are performed. Details of these various types of processing will be omitted.

In S422, The system control unit 208 determines whether or not an ending operation, such as turning the power off, has been performed. In a case where no ending operation has been performed, the flow returns to S420, and if there has been an ending operation, the flow ends.

According to the first exemplary embodiment, in a case where the variable angle monitor unit 120 is opened from a closed position, i.e., a non-use state where the display unit 101 is not visible), the system control unit 208 performs the following processing.

Case where the variable angle monitor unit 120 has been opened in less time than the predetermined amount of time x (less than predetermined time) from the shooting immediately prior: the system control unit 208 displays the image shot immediately prior on the display unit 101. At this time, in a case where the quick review function setting is on, the system control unit 208 automatically ends display of the image shot immediately prior, after a display time set beforehand has elapsed. In a case where the quick review function setting is off, the system control unit 208 displays the image shot immediately prior as a display in the playback mode.

Case where the variable angle monitor unit 120 has been opened after elapsing of the predetermined amount of time x (less than predetermined time): it can be assumed that the reason why the user has opened the variable angle monitor unit 120 is not to confirm the image shot immediately prior. Accordingly, the system control unit 208 first displays a menu screen to perform settings regarding shooting (shooting setting menu screen). The user can set shooting conditions (e.g., shutter speed, f-stop, etc.) by operating the operating unit 108, while confirming the shooting setting menu screen. In a case where the user has further opened the variable angle monitor unit 120 to the full-open position, it can be assumed that the reason why the user has opened the variable angle monitor unit 120 is to start up the live view display. Accordingly, in this case, the system control unit 208 performs live view display.

Thus, according to the first exemplary embodiment, display contents which the user desires can be displayed in accordance with the timing of the user opening the variable angle monitor unit 120.

While description has been made in the above example that a shooting setting menu screen is displayed in S415, live view display may be made instead of displaying the shooting setting menu screen. Thus, the user can confirm the image shot immediately prior, by opening the variable angle monitor unit 120 in less time than the predetermined time x after having shot the image with the variable angle monitor unit 120 in the closed position. On the other hand, in a case where the user has opened the variable angle monitor unit 120 after the predetermined time x has elapsed (including the half-open position, full-open position, and facing position), it can be assumed that the reason why the user has opened the variable angle monitor unit 120 is to perform live view display. Accordingly, in this case, the system control unit 208 automatically starts live view display.

Also, description has been made in the above example that a shooting setting menu screen is displayed in S415, an arrangement may be made where nothing is displayed until user operations are input. That is to say, the user can confirm the image shot immediately prior, by opening the variable angle monitor unit 120 in less time than the predetermined time x after having shot the image with the variable angle monitor unit 120 in the closed position. On the other hand, in a case where the user has opened the variable angle monitor unit 120 after the predetermined time x has elapsed (including the half-open position, full-open position, and facing position), it can be assumed that the reason why the user has opened the variable angle monitor unit 120 is not to confirm the image shot immediately prior. Accordingly, in this case, the system control unit 208 displays nothing in particular on the display unit 101. In a case where there is a subsequent user operation to display a shooting setting menu screen or to display a live view image, the system control unit 208 may perform a display corresponding to that operation on the display unit 101.

Second Exemplary Embodiment

In a second exemplary embodiment, description will be made regarding an example where a timing of the object-to-be-detected 111 being in proximity is taken as the reference for the timing of shooting immediately prior.

Figure 5A:
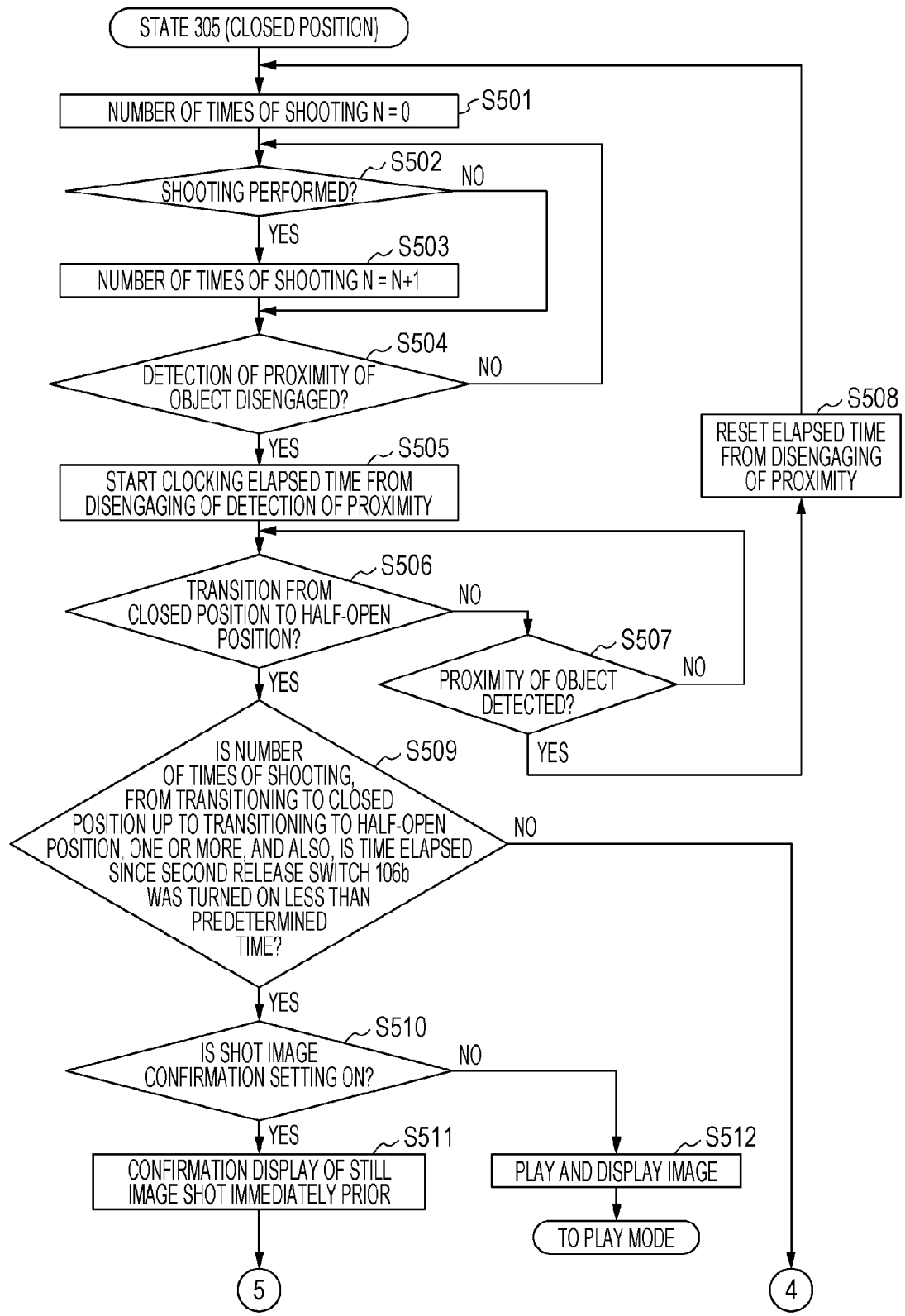
FIGS. 5A and 5B illustrate a flowchart of display content control according to the timing at which the state of the variable angle monitor unit changes, according to a second exemplary embodiment of the present invention.
Figure 5B:
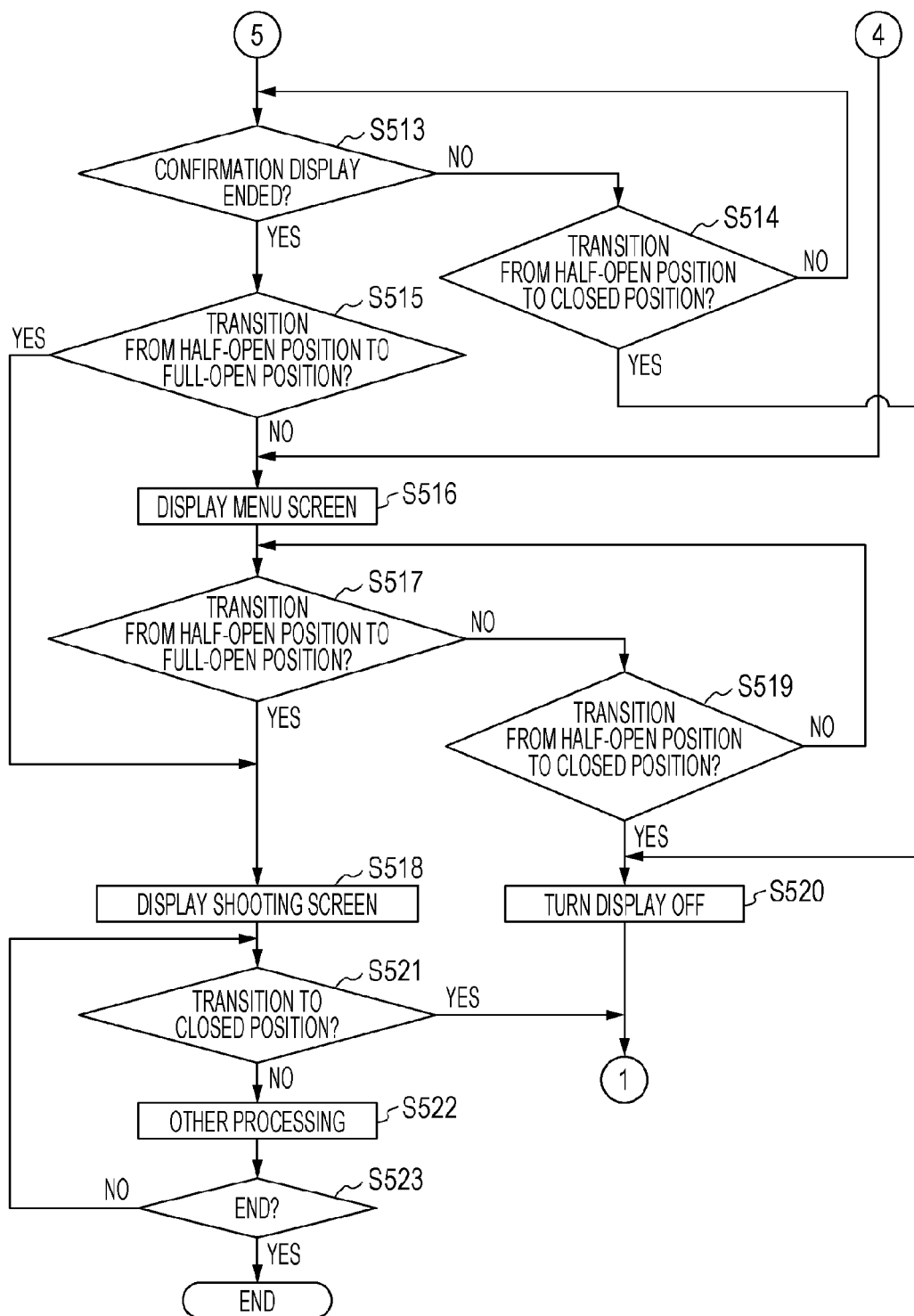

FIGS. 5A and 5B illustrate a flowchart of display control processing to control display contents in accordance with the timing of state change of the variable angle monitor unit 120, which is the second exemplary embodiment. A computer program to execute the display control processing in this flowchart is stored in the non-volatile memory 207, which is a storage medium, beforehand. The CPU of the system control unit 208 reads this computer program out from the non-volatile memory 207 where it is stored, loads it to the system memory 209, and executes it. Thus, the display control processing illustrated in this flowchart is carried out.

Note that S501, S503, and S510 through S523 in FIGS. 5A and 5B are similar processing to S401, S403, and S409 through S422 in FIGS. 4A and 4B described earlier in the first embodiment, so description thereof will be omitted.

In S502, the system control unit 208 determines whether or not shooting has been performed. In a case where shooting has been performed, the flow advances to S503, and if not, to S504.

In S504, the system control unit 208 determines whether or not detection of proximity of the object-to-be-detected 111 has been disengaged. An example of detection of proximity of the object-to-be-detected 111 having been disengaged is the user withdrawing the eye from the viewfinder 109 (or distancing the digital camera 100 from the eye). In a case of detection of proximity of the object-to-be-detected 111 having been disengaged, the flow advances to S505, and if detection of proximity of the object-to-be-detected 111 is not disengaged, the flow returns to S502.

In S505, the system control unit 208 starts clocking the elapsed time from disengaging detection of proximity of the object-to-be-detected 111, and the flow advances to S506.

In S506, the system control unit 208 determines whether or not the variable angle monitor unit 120 has transitioned from the closed position to the half-open position. In a case where the variable angle monitor unit 120 has transitioned to the half-open position, the flow advances to S509, and if not, to S507.

In S507, the system control unit 208 determines whether or not proximity of the object-to-be-detected 111 has been detected again. If there has been detection thereof, the flow advances to S508, and if not, returns to S506.

In S508, the system control unit 208 resets to zero the amount of time elapsed since proximity of the object-to-be-detected 111 was detected, and the flow returns to S501.

In S508, the system control unit 208 determines whether or not both of the following (1) and (2) are satisfied; (1) the number of times of shooting N from the variable angle monitor unit 120 transitioning to closed position up to transitioning to half-open position is one or more, and (2) time elapsed since detection of proximity of the object-to-be-detected 111 was disengaged is less than a predetermined time x. The predetermined time x is the same as that in the first exemplary embodiment. In a case where these (1) and (2) are both satisfied, the flow advances to S510. If either one of (1) and (2) are not satisfied, the flow advances to S516.

As described above, according to the second exemplary embodiment, the display content can be control with the timing at which the user withdraws the eye from the viewfinder 109 as a reference for the timing of the shooting immediately prior.

Third Exemplary Embodiment

In a third exemplary embodiment, description will be made regarding an example where the time of ending exposure is taken as the reference for the timing of shooting immediately prior.

Figure 6B:
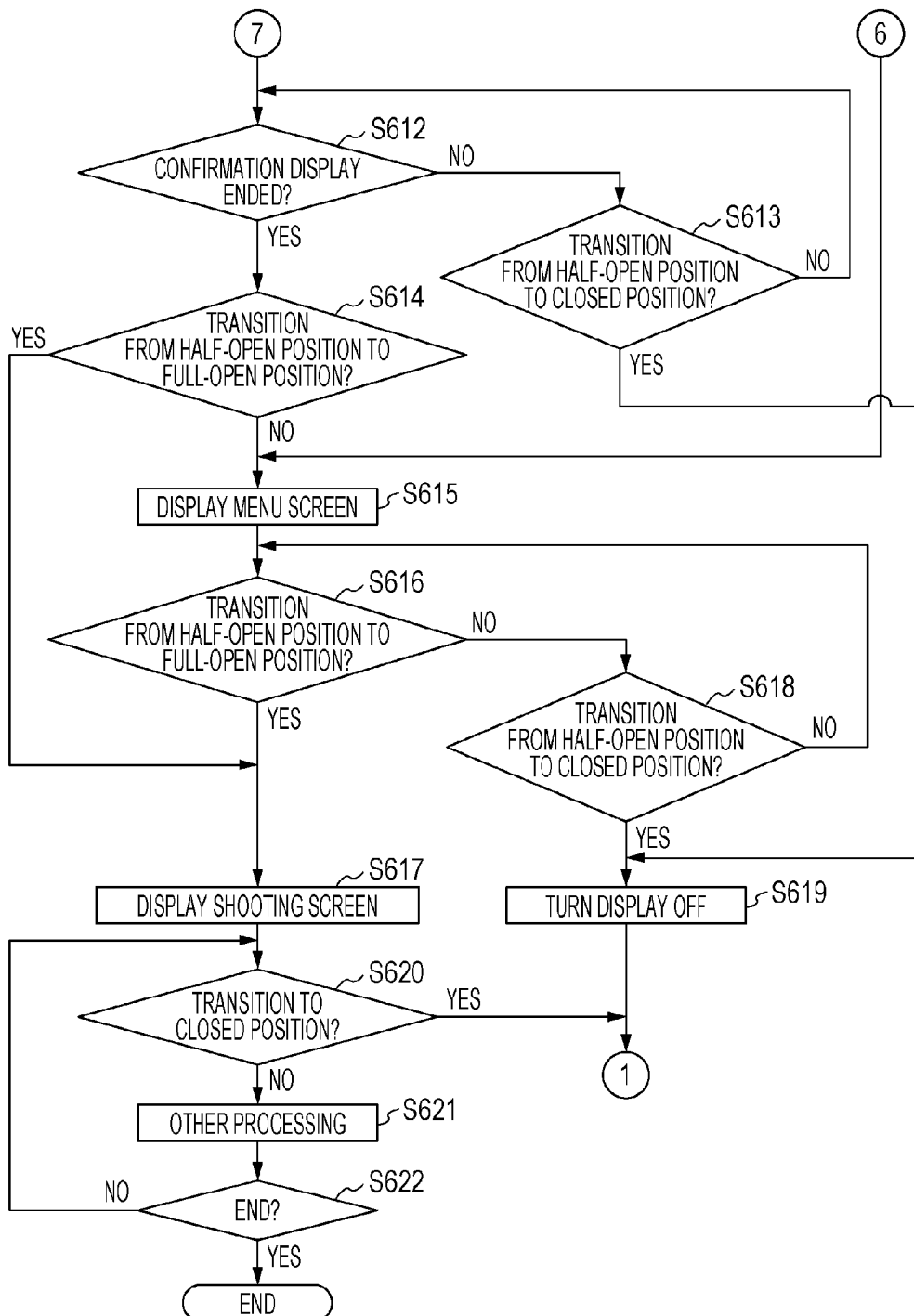

FIGS. 6A and 6B illustrate a flowchart of display control processing to control display contents in accordance with the timing of state change of the display unit 101, which is the third exemplary embodiment. A computer program to execute the display control processing in this flowchart is stored in the non-volatile memory 207, which is a storage medium, beforehand. The CPU of the system control unit 208 reads this computer program out from the non-volatile memory 207 where it is stored, loads it to the system memory 209, and executes it. Thus, the display control processing illustrated in this flowchart is carried out.

Note that S601 through S603, S605, and S609 through S622 in FIGS. 6A and 6B are similar processing to S401 through S403, S405, S407, and S409 through S422 in FIGS. 4A and 4B described earlier in the first embodiment, so description thereof will be omitted.

In S604, the system control unit 208 starts clocking the time elapsed since exposure has ended, and the flow advances to S607. Note that the system control unit 208 resets to zero this clock each time shooting is performed, and starts clocking anew.

In S606, the system control unit 208 continues clocking the time elapsed since exposure has ended, and the flow advances to S607.

In S608, the system control unit 208 determines whether or not both of the following (1) and (2) are satisfied; (1) the number of times of shooting N from the variable angle monitor unit 120 transitioning to closed position up to transitioning to half-open position is one or more, and (2) time elapsed since exposure has ended was less than a predetermined time x. In a case where these (1) and (2) are both satisfied, the flow advances to S609. If either one of (1) and (2) are not satisfied, the flow advances to S615.

As described above, according to the third exemplary embodiment, the display content can be control with the timing at which shooting exposure ends as a reference for the timing of the shooting immediately prior.

While description has been made of embodiments of the present invention, the present invention is not restricted to these embodiments; rather, various modifications and alterations may be made without departing from the essence thereof.

Different display transition may be performed in the above embodiments in a case where determination is made that the digital camera 100 is attached to a tripod. For example, if determination has been made that the digital camera 100 is attached to a tripod, a level and/or grid line may be displayed instead of the display of the image that has been shot, in a case where the variable angle monitor unit 120 has been changed from the closed position to the full-open position at a timing where the predetermined time x has elapsed. Alternatively, a level and/or grid line may be displayed along with the display of the image that has been shot. Whether attached to a tripod may be determined by detecting connection to a tripod or detecting no motion with an acceleration sensor.

Also, processing corresponding to detection of an intermediate position between the facing position and the reverse-closed position (a position where the display screen is facing the opposite of the half-open position, also referred to as "reverse half-open position") may be made. For example, live view may be displayed upon detecting in a case where live view is not being displayed on the display unit 101, that the variable angle monitor unit 120 has transitioned from the facing position to the reverse half-open position, and further transitioned from the reverse half-open position to the facing position, within a predetermined amount of time. This allows the variable angle monitor unit 120 to be operated and live view display started easily from the object side (side from which the display face of the display unit 101 can be viewed when at the facing position).

Note that the control of the system control unit 208 may be performed by one hardware configuration, or the processing may be shared among multiple hardware configurations, to control the overall apparatus.

While the present invention has been described with reference to embodiments, the invention is not restricted any particular embodiments; rather, various forms not departing from the essence of the invention are encompassed by the present invention. Further, the embodiments are only illustrative, and various embodiments may be combined as suitable.

Note that while an example of applying the present invention to a digital camera has been described in the above embodiments, the present invention is not restricted to this example. The present invention is applicable to any imaging apparatus that has a variable angle monitor unit.

According to the above configurations, an imaging apparatus is provided which enables what the user desires to view displayed, to be displayed in accordance with timing of operating a variable angle monitor unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-108151, filed May 22, 2013, which is hereby incorporated by reference herein in its entirety.

What is claimed is:

1. An imaging apparatus comprising:
   a main body unit;
   an imaging unit included in the main body unit;
   a clocking unit configured to clock elapsed time from an imaging process last performed, every time the imaging unit performs the imaging process;
   a monitor unit linked to the main body unit so as to be capable of being opened and closed as to the main body unit;
   a display unit included in the monitor unit;
   a monitor position detecting unit configured to detect the position of the monitor unit as to the main body unit;
   an obtaining unit configured to obtain the elapsed time clocked by the clocking unit when the monitor position detecting unit has detected the position of the monitor unit having been changed from a position at which a display face of the display unit is closed with respect to the main body unit to a position at which the display face of the display unit is opened with respect to the main body unit,
   a display control unit configured to display, on the display unit, a shooting setting menu screen for receiving a setting of shooting conditions in a case where the elapsed time is longer than a predetermined time, and display, on the display unit, an image generated through the imaging process last performed in a case where the elapsed time is shorter than a predetermined time.

2. The imaging apparatus according to claim 1, further comprising:
   a shutter button configured to output a shooting preparation instruction when half-pressed, and output a shooting instruction when full-pressed;
   wherein the clocking unit is configured to clock elapsed time from the full-pressed.

3. The imaging apparatus according to claim 1, wherein the time elapsed from shooting immediately prior is the time elapsed from ending of exposure of still shooting immediately prior.

4. The imaging apparatus according to claim 1, wherein, in a case where shooting has not been performed in the closed position, the display control unit does not display the newest image on the display unit regardless of the elapsed time, even if detection is made that the position of the display face of the display unit has changed from the closed position facing the main body unit to the open position.

5. The imaging apparatus according to claim 1, wherein, in a case where a quick review function, which automatically displays a shot image after shooting in a state where the display unit can perform display, is set to on, the display control unit ends display of the newest image after a predetermined amount of time has elapsed from starting display of the newest image.

6. The imaging apparatus according to claim 1, wherein the display control unit displays the shooting setting menu screen if the position of monitor unit is at the half-open position, and displays a live view if the position of the monitor unit has transitioned from the half-open position to a full-open position.

7. A computer-readable non-transitory recording medium storing a program which causes a computer to function as the units of the imaging apparatus according to claim 1.

8. A control method of an imaging apparatus including
a main body unit,
an imaging unit included in the main body unit,
a clocking unit configured to clock elapsed time from an imaging process last performed, every time the imaging unit performs the imaging process;
a monitor unit linked to the main body unit so as to be capable of being opened and closed as to the main body unit, and
a display unit included in the monitor unit, the method comprising:
a step to detect the position of the monitor unit as to the main body unit;
a step to obtain the elapsed time clocked by the clocking unit when the position of the monitor unit has been detected and has been changed from a position at which a display face of the display unit is closed with respect to the main body unit to a position at which the display face of the display unit is opened with respect to the main body unit, and
a step to display, on the display unit, a shooting setting menu screen for receiving a setting of shooting conditions in a case where the elapsed time is longer than a predetermined time, and display, on the display unit, an image generated through the imaging process last performed in a case where the elapsed time is shorter than a predetermined time.

* * * * *